Patented Mar. 4, 1941

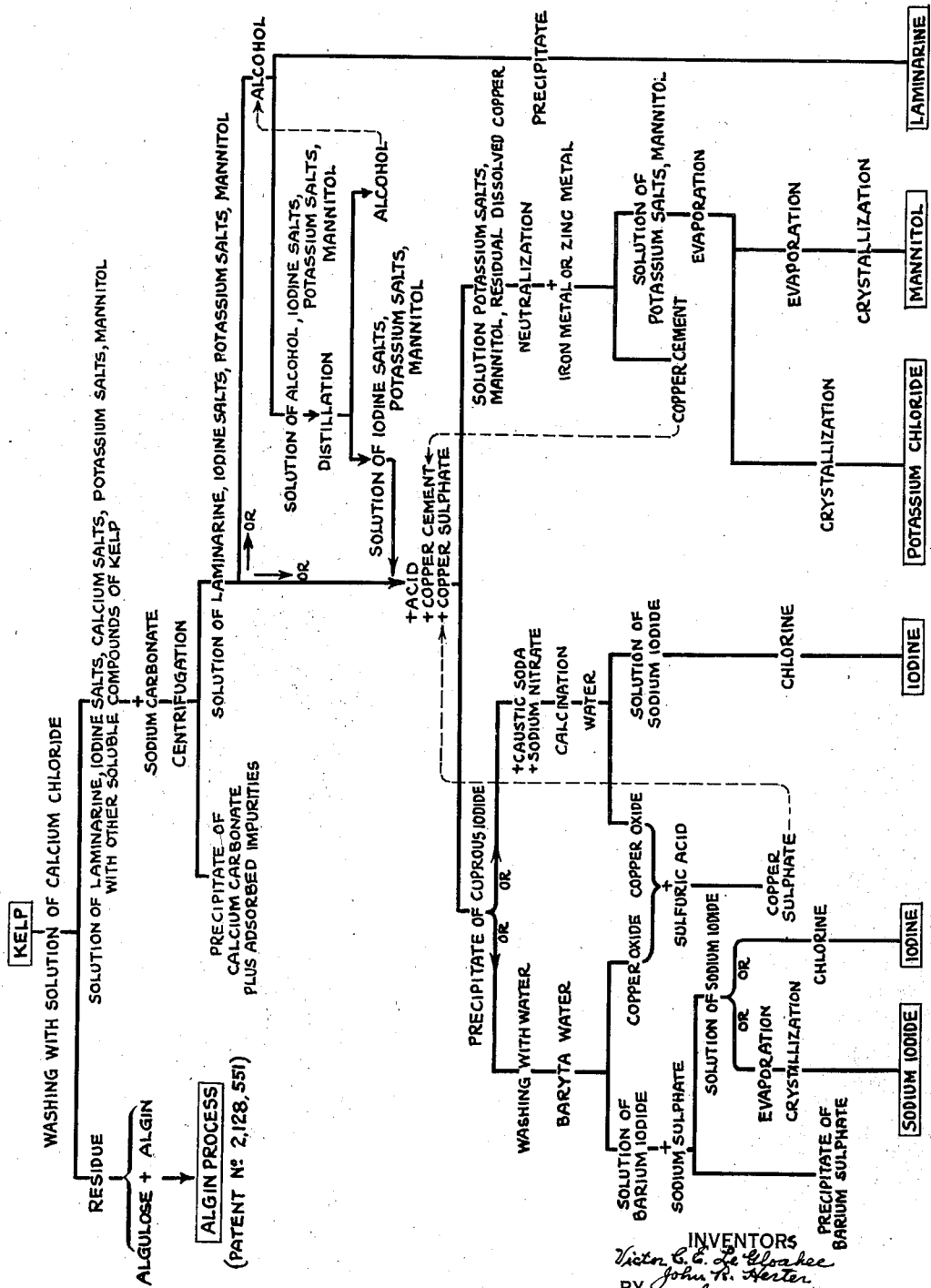

2,233,787

UNITED STATES PATENT OFFICE 2,233,787

IODINE RECOVERY

Victor Charles Emile Le Gloahec, Rockland, Maine, and John Robert Herter, New York, N. Y., assignors to Algin Corporation of America, New York, N. Y., a corporation of Delaware Application January 20, 1938, Serial No. 185,810
In France January 11, 1934

5 Claims. (Cl. 23—97)

This invention relates to iodine recovery, i. e., the recovery of iodine and/or iodine compounds from solutions containing iodine salts.

In the practice of this invention an aqueous solution of a soluble iodine salt is treated with a water soluble copper salt to precipitate cuprous iodide, the precipitation being in the presence of an acid and of metallic copper as an anti-oxidizing agent. The solution of soluble iodine salt may contain soluble iodine salts such as the iodine salts of alkali metals, alkaline earths, ammonium or magnesium. After the cuprous iodide has been precipitated it can then be treated for the recovery of iodine or iodine compounds as described below. Features of this invention relate to the precipitation step and to the recovery steps and to the employment of these steps in combination.

An available source of iodine is certain seaweeds, such as laminaria and pheophyceae, macrocystis, and nereocystis. Such seaweeds contain a great number of bodies, to wit: salts, including iodine salts, most of which are salts of alkaline metals (e. g. sodium or potassium) and of ammonium and magnesium and various organic matters, the most important of which are: algin, laminarine, mannitol and algulose (seaweed cellulose).

The recovery of alginous material from seaweed is described in our copending application Serial No. 1076, filed January 9, 1935, (now Patent No. 2,128,551 dated August 30, 1938) the present application being a continuation-in-part of said application.

To illustrate the practice of this invention there will be described the preparation of a solution of iodine containing salts from seaweeds and the recovery of iodine or iodine compounds therefrom. The seaweed is first treated for the extraction of the iodine-containing material. This can be done in several ways as the iodine-containing material is in the form of water soluble salts and can be readily extracted from the seaweeds with water. Preferably, the iodine-containing material, together with laminarine is separated from the algulose and algin in the seaweed in accordance with the practice set forth in Patent No. 2,128,551. For this purpose, advantage is taken of the fact that laminarine remains soluble in water in the presence of alkaline-earth salts and can be separated from the algulose and algin along with iodine-containing material. After extraction of the seaweed with alkaline-earth salts, the seaweed is subsequently washed with soft water so as to complete the removal of the iodine containing material therefrom.

The following is an example of the separation of iodine-containing material, together with laminarine and certain other matters from seaweed, which may be either freshly taken from the water or be in dried condition. In order to make a good separation, we take, for example, 1000 parts by weight of dried seaweed still containing about 30% of moisture and make use of from 2.2 to 2.8 parts by weight of calcium chloride (anhydrous) or from 4.9 to 6.2 parts of barium chloride (crystallized with two molecules of water). About 3000 parts by volume of solution is used for exhausting the amount of seaweed abovementioned. This solution therefore contains from 0.8 to 1% of anhydrous calcium chloride, for example. If the process is carried out with seaweed as freshly taken from water the proportions of alkaline-earth salt must be reduced about five times. The treatment may be carried out either in the hot state or in the cold state. However, we have found that it is advantageous to operate in the cold state.

The seaweed is then washed with soft water which removes the excess alkaline-earth salts and at the same time removes the remainder of the laminarine and the iodine-containing material from the seaweed, together with certain other matters such as mannitol. This operation of washing with soft water is stopped, merely for the sake of economy, when the exhausting waters contain only ½% approximately of soluble matters.

In order to facilitate the subsequent recovery of the soluble products removed from the seaweeds that are treated, it is advisable to carry out the treatment with a solution of alkaline-earth salts and the subsequent washing with soft water in a systematic manner according to known methods in order to render the washing water as rich as possible. The wash waters are then treated as hereinbelow described for the removal of certain materials including iodine or iodine compounds therefrom. If the wash waters are re-used it is then necessary to add a desired amount of alkaline earth salts thereto before they come into contact with seaweeds that have not been exhausted.

The algulose and algin residue which has been washed may be treated for the recovery of algin in a pure form in accordance with Patent No. 2,128,551.

According to the present invention, the wash waters which include iodine-containing material are first treated with an alkali metal carbonate such as sodium carbonate to form a precipitate which carries down impurities. For example, we add to the juices a solution of sodium carbonate of fifteen per cent. concentration until the end of the precipitation. The precipitate consisting chiefly of an alkaline-earth carbonate is separated from its mother liquor, for instance, by centrifuging in a suitable apparatus of which many types, such as the Sharples centrifugal machines, are well known. The residue is washed twice with a volume of water equal to three times the volume of said residue, with a centrifugal treatment between these two washing operations, and the washing waters are mixed with the initial mother liquors. The whole contains a rather low percentage of iodine, to wit, from one to two kilograms per cubic meter. While the purification step above described is preferable prior to the precipitation step described below, in order to obtain the precipitate in better form, the purification step is not essential.

In order to precipitate the iodine from a solution of soluble iodine salt, e. g., the solution of soluble iodine salt recovered from seaweed as above-described, in the form of copper iodide by means of a soluble copper salt such as copper sulphate with a good yield, precipitation should take place not only in the presence of an acid such as sulphuric or hydrochloric acids but also in the presence of metallic copper as an anti-oxidizing agent.

By way of example, we obtain satisfactory results through the following method:

The liquid to be treated is contained in a suitable tank of wood or of stoneware, and there is added thereto for each part in weight of iodine:

(a) A solution of copper sulphate containing 3.5 parts of crystallized salt, the amount of copper sulphate being that which results from the use of the commercial product which is in either crystalline or powdered form and which corresponds to the formula $CuSO_4.5H_2O$;

(b) A sufficient amount of sulphuric acid in order that the solution may contain about two per cent. of sulphuric acid in excess. Hydrochloric acid may also be utilized.

(c) Metallic copper, preferably produced by precipitation of copper from a solution of a soluble copper salt, as an anti-oxidizing body and catalyst. Metallic copper in the form of shavings or plates may also be used.

The precipitation is sufficient after a period of twenty-four hours. The precipitate of cuprous iodide is then subjected to centrifuging.

Metallic copper produced by precipitation of copper from a solution of a soluble copper salt, is, as aforesaid, preferable to other forms of metallic copper, because we have found that when copper precipitated from solution is used in the aforesaid precipitation reaction the reaction is much more rapid and gives a higher yield of cuprous iodide than when other forms of metallic copper are used.

Other soluble copper salts such as copper chloride or copper acetate may also be used, although copper sulphate is usually to be preferred. If desired, a reducing agent compatible with acid such as sodium bisulphite, hydrogen gas, $SO_2$ gas or the like may be present during the precipitation step.

In the mother liquor, copper is recovered by precipitating copper in said liquor with iron, preferably after having been neutralized by means of lime, soda ash or the like. The precipitated copper produced in this way may be used as the anti-oxidizing agent in the precipitation step. Alternatively the precipitated copper may be transformed into copper sulphate and copper sulphate produced in this way may be used to effect precipitation of copper iodide in the precipitation step.

The residual liquor freed from copper is then freed from the iron that is contained therein, by means of lime; then it is filtered. Finally, if desired, the liquid can be evaporated in order to separate the salts and the mannitol present therein by fractional crystallization.

As for the precipitate of cuprous iodide, it is calcined in the presence of caustic soda or potash, with an excess of alkali of about two or three per cent. Then sodium nitrate is added, in the proportion of about 130 parts in weight for 150 parts of cuprous iodide, in the form of a paste produced as by centrifuging. While sodium nitrate is regarded as preferable, other oxidizing agents such as sodium perborate, calcium oxide, lead dioxide, or the like may be used. The amount of oxidizing agent used preferably should not exceed that which is necessary to transform the cuprous oxide to copper oxide. The mixture is calcined at a temperature of about 350–375° C., for about ten minutes. After cooling, the calcined product is treated with water, and the resulting product is filtered. The liquor which is a solution of sodium iodide may be treated as by evaporation to recover sodium iodide. Alternatively the liquor may be treated by known methods for the precipitation of iodine; for instance, it can be treated with chlorine for this purpose. The iodine thus obtained may be finally refined by sublimation. The residue of the lixiviation is copper oxide, which may be transformed into copper sulphate by known methods.

It is also possible to treat the precipitate of cuprous iodide to obtain soluble iodides in other ways.

For example, this precipitate is washed twice with five times its volume of water, and it is then treated with a slight excess of baryta water containing about twenty-five per cent. of barium hydroxide at a temperature of 90–100° C. The following reaction takes place:

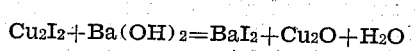
$$Cu_2I_2+Ba(OH)_2=BaI_2+Cu_2O+H_2O$$

The liquor is filtered in order to separate the copper oxide, which may be transformed into copper sulphate. The clear solution is treated with a molecular amount of the sulphate of the metal, the iodide of which is to be prepared, for instance, according to the following reactions:

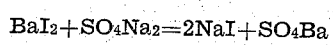
$$BaI_2+SO_4Na_2=2NaI+SO_4Ba$$

The use of baryta water in carrying out the foregoing steps is preferable to the use of other metallic hydroxides due to the fact that barium sulphate is more insoluble than the other metallic sulphates and results in a more pure product.

The whole is caused to boil in order to agglomerate barium sulphate and then it is filtered. Finally, the solution of iodide is concentrated and allowed to crystallize by cooling. In addition to the recovery of sodium iodide, other soluble iodides may be recovered such as iodide of potassium, magnesium, ammonium, and the like by adding to the barium iodide solution a soluble metallic sulphate. It is to be understood that the specific examples herein given are for illustrative purposes merely and that the scope of this invention is not limited thereby.

If desired, the wash waters obtained by washing seaweed with a solution of alkaline earth salt solution, which wash waters contain laminarine as well as soluble iodine containing substances, may be treated to eliminate the laminarine before the iodine is precipitated as cuprous iodide. This may be done as described in our application executed January 18, 1938, for Removal and recovery of laminarine from seaweed, now patent No. 2,188,092 issued January 23, 1940 on application Serial No. 185,838 filed January 20, 1938, e. g., by precipitating the laminarine by means of alcohol or by means of subacetate of lead in an alkaline medium. This may be done before or after the step above-described wherein the alkaline earth metal salts in the solution are precipitated in the form of alkaline earth metal carbonate, if said step is employed.

In order to facilitate an understanding of the present invention and pursuant to the foregoing, the practice thereof is exemplified by the flow sheet shown in the accompanying drawing. It is to be understood, however, that the process indicated in the accompanying drawing is merely illustrative and that the scope of this invention is to be governed by the language of the following claims.

We claim:

1. A method of treating seaweed which comprises washing the seaweed with an aqueous washing liquid to dissolve iodine-containing substances and laminarine, separating the washing-solution containing dissolved materials from the undissolved material, adding to the solution a precipitant for the laminarine, separating the precipitated laminarine from liquid containing dissolved iodine-containing substances, and precipitating the iodine as cuprous iodide by incorporating in the solution a water-soluble copper salt, the precipitation being in the presence of a mineral acid and of metallic copper precipitated from a solution of a soluble copper salt.

2. In a method of recovering a substance comprising iodine, the step comprising precipitating cuprous iodide from an aqueous solution of a water-soluble iodine salt by incorporating in the solution a water-soluble copper salt, the precipitation being in the presence of a mineral acid and of metallic copper in the original finely divided form as precipitated from a solution of a soluble copper salt by a metal.

3. The step according to claim 2, wherein the acid is an acid selected from the group consisting of hydrochloric acid and sulphuric acid.

4. A method according to claim 2 and wherein the precipitated cuprous iodide is calcined with caustic alkali and an oxidizing agent, and the calcined product is extracted with water.

5. A method according to claim 2 and wherein the cuprous iodide is treated with baryta water to form barium iodide and the barium iodide is treated with a sulphate of a metal of the iodide of which is to be recovered to form a soluble iodine salt of said metal and precipitated barium sulphate, and the soluble iodine salt is separated from the barium sulphate.

VICTOR CHARLES EMILE LE GLOAHEC.
JOHN ROBERT HERTER.